US012158883B2

(12) United States Patent
Zeng et al.

(10) Patent No.: US 12,158,883 B2
(45) Date of Patent: Dec. 3, 2024

(54) VISUALLY MAPPING NODES AND CONNECTIONS IN ONE OR MORE ENTERPRISE-LEVEL SYSTEMS

(71) Applicant: UNITED STATES POSTAL SERVICE, Washington, DC (US)

(72) Inventors: Hui Zeng, Fairfax, VA (US); Douglas R. Shumway, Gaithersburg, MD (US); Paul A. Geske, Raleigh, NC (US); Wilairat Udomsawat, Fairfax, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 357 days.

(21) Appl. No.: 17/131,080

(22) Filed: Dec. 22, 2020

(65) Prior Publication Data

US 2021/0191930 A1 Jun. 24, 2021

Related U.S. Application Data

(60) Provisional application No. 62/952,584, filed on Dec. 23, 2019.

(51) Int. Cl.
G06F 16/25 (2019.01)
G06F 16/242 (2019.01)
G06F 16/901 (2019.01)

(52) U.S. Cl.
CPC ........ *G06F 16/2428* (2019.01); *G06F 16/252* (2019.01); *G06F 16/258* (2019.01); *G06F 16/9024* (2019.01)

(58) Field of Classification Search
CPC .. G06F 16/2428; G06F 16/252; G06F 16/258; G06F 16/9024
See application file for complete search history.

(56) References Cited

U.S. PATENT DOCUMENTS

| | | | |
|---|---|---|---|
| 7,593,341 B1 * | 9/2009 | Buriol | H04L 45/12 370/408 |
| 10,887,192 B2 * | 1/2021 | Thomasson | H04L 41/12 |
| 2015/0332185 A1 * | 11/2015 | Zakkam | G06Q 10/0637 705/7.36 |
| 2016/0226701 A1 * | 8/2016 | Luo | H04L 41/022 |
| 2017/0085446 A1 * | 3/2017 | Zhong | H04L 41/12 |
| 2018/0131585 A1 * | 5/2018 | Bliesner | H04L 67/75 |

* cited by examiner

*Primary Examiner* — Irete F Ehichioya
*Assistant Examiner* — Xiaoqin Hu
(74) *Attorney, Agent, or Firm* — MH2 Technology Law Group LLP

(57) ABSTRACT

A computer-implemented method includes receiving data records from a plurality of different data sources, in which the data records include information regarding elements or components in one or more systems; consolidating the data records; extracting information from the consolidated data records to identify a plurality of nodes and connections between the plurality of nodes in the one or more systems; storing information identifying the plurality of nodes and the connections; and visually presenting the plurality of nodes and the connections in a user interface.

15 Claims, 11 Drawing Sheets

| Network Map View | Table View | | Navigation Flow | 184 / 1838 Applications<br>681 / 3572 Data Fields |
|---|---|---|---|---|

| 25 ▼ | DOWNLOAD | | | | 1 | 2 | 3 | Next |

| Source | Target | Source ID | Target ID | Sending Description | | | | Sending Data |
|---|---|---|---|---|---|---|---|---|
| ZONE CHARTS | POS | 1029 | 6146 | Details are provided in the EIR | | | | |
| ZONE CHARTS | NCOA | 1029 | 6014 | Details are shown in the EIR | | | | |
| POS | ZONE CHARTS | 6146 | 1029 | Details are provided in the EIR | | | | |
| NCOA | ZONE CHARTS | 6014 | 1029 | Details are shown in the EIR | | | | |
| DSP | ITWEB | 1147 | 4014 | DSP provides a SOX auditing feed to ITWEB. | | | | |
| DSP | ITCA | 1147 | 4546 | ITCA relies on data from this resource to perform logical analysis and produce reports. | | | | |
| ITWEB | DSP | 4014 | 1147 | DSP provides a SOX auditing feed to ITWEB. | | | | |
| ITCA | DSP | 4546 | 1147 | ITCA relies on data from this resource to perform logical analysis and produce reports. | | | | |
| PTR | DSP | 4247 | 1147 | Reference NCRB00103671147.00 DMS AWR to store AWR data for PTR and coming from INFRASUPP | | | | |
| DSP | PTR | 1147 | 4247 | Reference NCRB00103671147.00 DMS AWR to store AWR data for PTR and coming from INFRASUPP | | | | |
| AIS PF | MERLIN | 2875 | 1148 | Current Weekly DPF Master | | | | DPFMPN. |
| POSTALONE!-BCSS | MERLIN | 4004 | 1148 | Postage Statement Message: A Postage Statement Message (PSM) is sent by PostalOne! (PBVS) to MMOD so that MMOD can setup a verification at a MERLIN machine. It is the aim of PostalOne! (PBVS) to send MMOD the PSM on demand when the clerk is ready to perform a MERLIN postage statement verification. Contains information from the postage statement that MERLIN needs to perform a verification | | | | |

FIG. 1H

VISUALLY MAPPING NODES AND CONNECTIONS IN ONE OR MORE ENTERPRISE-LEVEL SYSTEMS

CROSS-REFERENCE TO RELATED APPLICATIONS

This application claims the benefit of and priority to U.S. Provisional Patent Application 62/952,584, which was filed on Dec. 23, 2019, and is incorporated herein by reference in its entirety.

BACKGROUND

An organization or enterprise can be complex in structure, including many types of elements, such as resources, infrastructure, hardware/software, and other "moving parts." Effective system management at the enterprise level may involve effectively identifying how one element in a system is affected by changes made to another component, even when the two elements may seem unrelated.

SUMMARY

In one example aspect, a computer-implemented method includes receiving data records from a plurality of different data sources, in which the data records include information regarding elements or components in one or more systems; consolidating the data records; extracting information from the consolidated data records to identify a plurality of nodes and connections between the plurality of nodes in the one or more systems; storing information identifying the plurality of nodes and the connections; and visually presenting the plurality of nodes and the connections in a user interface.

In an example aspect, a computer program product includes a computer readable storage medium having program instructions embodied therewith. The program instructions are executable by a computing device to cause the computing device to perform operations including: receiving data records across a plurality of different data sources in which the data records include information regarding elements or components in one or more systems; consolidating the data records; extracting information from the consolidated data records to identify a plurality of nodes and connections between the plurality of nodes in the one or more systems; storing information identifying the plurality of nodes and the connections; and visually presenting the plurality of nodes and the connections in a user interface.

In an example aspect, a system includes a processor, a computer readable memory and a computer readable storage medium associated with a computing device, program instructions to receive data records across a plurality of different data sources, wherein the data records include information regarding elements or components in one or more systems; program instructions to consolidate the data records; program instructions to extract information from the consolidated data records to identify a plurality of nodes and connections between the plurality of nodes in the one or more systems; program instructions to store information identifying the plurality of nodes and the connections; and program instructions to visually present the plurality of nodes and the connections in a user interface. The program instructions are stored on the computer readable storage medium for execution by the processor via the computer readable memory one or more memory devices that stores instructions; and one or more processors that are operably connected to the one or more memory devices and that execute the instructions to perform operations including: receiving data records from a plurality of different data sources, wherein the data records include information regarding elements or components in one or more systems; consolidating the data records; extracting information from the consolidated data records to identify a plurality of nodes and connections between the plurality of nodes in the one or more systems; storing information identifying the plurality of nodes and the connections; and visually presenting the plurality of nodes and the connections in a user interface.

BRIEF DESCRIPTION OF THE DRAWINGS

FIG. 1H illustrates a GUI showing an example of table view representing nodes in a system.

DETAILED DESCRIPTION

Figure 1A:
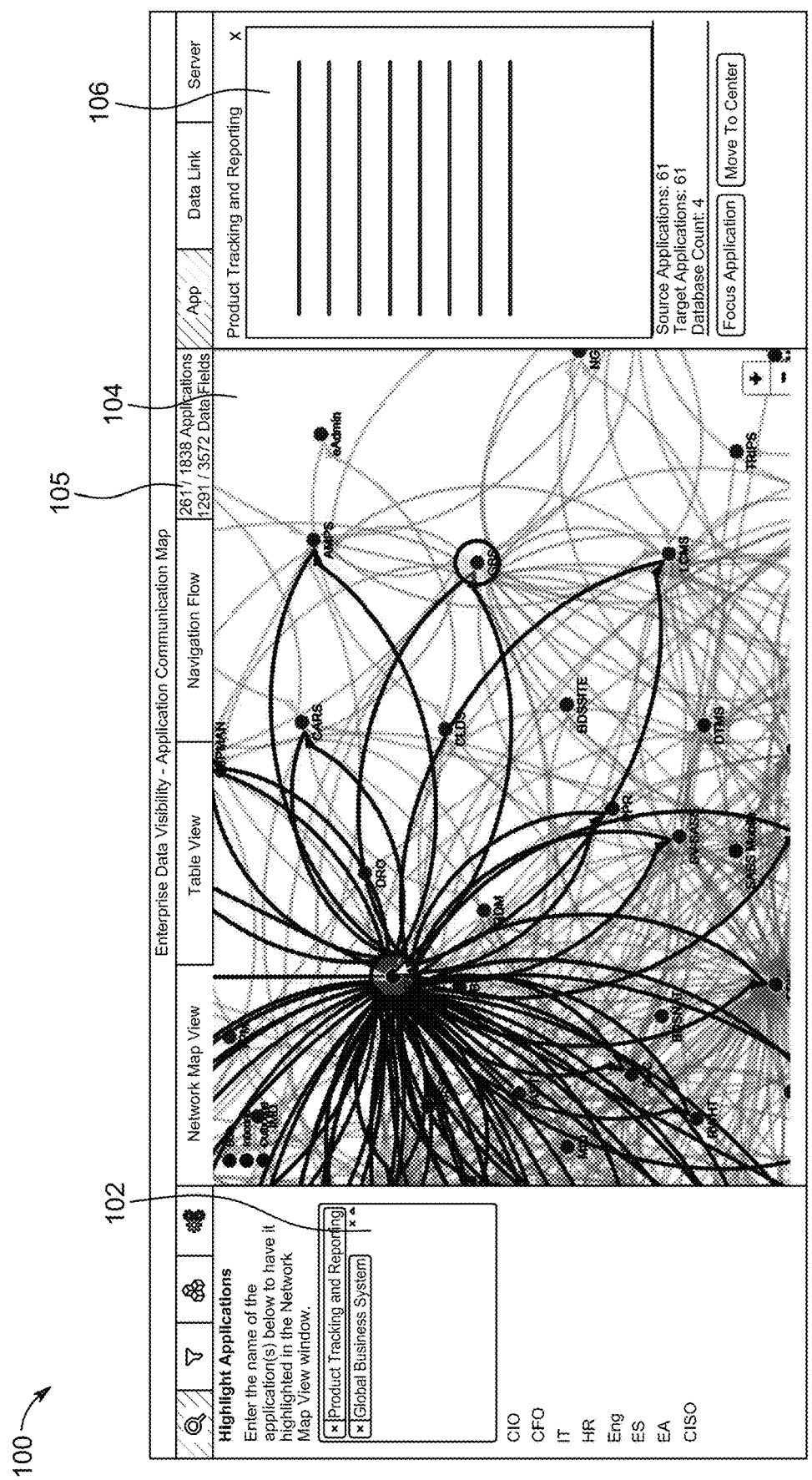
FIG. 1A illustrates a graphical user interface (GUI) showing an overview of an example implementation in accordance with aspects of the present disclosure.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Aspects of the present disclosure may include a system and/or method that consolidates information across multiple different data sources, and visually presents, e.g., using a GUI, connections between nodes in one or more systems based on the consolidated information. In some embodiments, a force directed graph style model may be employed to visually represent the connections in which each node represents any variety of elements in one or more systems of varying sizes (e.g., from an enterprise level to a local or small-scale level). As illustrative examples, each node may represent a document in a library of documents, an organization in an enterprise, an application, a server, one or more virtual machines, a database, a sub-system (e.g., a sub-system for tracking package locations, a pricing system, etc.), or the like. The nodes may be connected based on their relationships, interactions, or communications flow. In other words, a "connection" may represent a relationship or commonality between two nodes. For example, two nodes representing organizations in an enterprise that exchange information with each other may be connected. Similarly, two nodes representing different types of sub-systems that exchange information with each other may be connected. As another example, two nodes that represent documents may be connected when the two documents have a relationship to each other, or share common attributes (e.g., a common subject, common authors, common department managers, etc.). As another example, two nodes that represent databases, servers, and/or virtual machines that communicate with each other may be connected.

Aspects of the present disclosure may automatically consolidate information regarding nodes and their connections from multiple data sources, and present the consolidated information in a cohesive and simple interface that is less cluttered than a conventional graph interface. In this way, system management, planning, and decision-making is improved by providing a technically improved interface to easily identify all of the "moving parts" in a complex system, and providing insight as to how one node may be affected by changes made to a different node, even when the nodes may appear to be unrelated.

In a situation in which hundreds, thousands, or more nodes may be interlinked, aspects of the present disclosure provide a simple and effective technique for visually identifying the relationships between the nodes, which is not available in conventional directed graph displays. That is, aspects of the present disclosure may present a "big picture" view of relationships and/or dependencies between nodes representing various types of real-life elements. In this way, when one node is affected by a change or proposed change (e.g., by a policy change, a system change, a software change, a hardware change, a change in its associated data, etc.), other nodes that are also affected may be easily identified, and changes may be synchronized across all affected nodes (e.g., across all of the physical machines, systems, data, etc. represented by the affected nodes). Accordingly, aspects of the present disclosure may display an enterprise-level view of an entire system, to facilitate synchronous communications between the nodes, whether those nodes are applications, servers, virtual machines, organizations, etc. Additionally, or alternatively, from the enterprise-level view, data flow redundancies may be identified and eliminated, which provides technical improvements that include reduced bandwidth usage, reduced power usage, elimination of data-update race conditions, and the like.

As one illustrative example, the techniques described herein may be used to identify nodes affected by the implementation of a software update to ensure that the software, etc. is updated on all affected nodes, and to analyze and prepare for any downtime in relation to the software update. Similarly, the techniques described herein may be used to identify nodes affected by the implementation of a software or hardware transition (e.g., a transition to cloud-based applications, a transition from one operating system to another, a transition from one type of hardware to another etc.), which improves the technical operation of the system by ensuring that all affected systems are transitioned so that they can continued to communicate and technically interact with each other. As another illustrative example, the techniques described herein may be used to identify nodes affected by a change in specific shared data, such as data that represents a price (e.g., the price of a service or item) such that any elements within those nodes that are affected by the price data change can be updated (e.g., pricing systems, accounting systems, documents containing pricing information, etc.). As another illustrative example, the techniques described herein may be used to identify nodes with redundancies (e.g., redundant functions, redundant infrastructure etc.), and reduce those redundancies as appropriate which provides technical improvements that include reduced bandwidth usage, reduced power usage, reduced system complexity, and the like. In one or more embodiments, aspects of the present disclosure may be used to analyze outage impact. As an example, in an implementation in which each node represents a computing system, aspects of the present disclosure may be used to determine which nodes are affected by the outage of a particular system, and the level of impact of the outage (e.g., which may be based on the number of layers and/or degrees between the nodes). In this way, high impact nodes may be identified for remediation. As another illustrative example, the techniques described herein may be used to identify nodes affected by a change in policy, such as a change in General Data Protection Regulation (GDPR) policies that may need to be implemented.

In some embodiments, the degrees to which one node is connected to another may be identified (e.g., directly connected or connected via additional or intermediary nodes). Further, the number of degrees between nodes may be used to determine the level of impact between the nodes when one of the nodes is updated. For example, if two nodes are not directly connected, but are several degrees apart, the impact of a change to one of the nodes may be considered to be relatively small for the other node, and thus, changes to both nodes need not be synchronized if synchronizing those changes is deemed to be more costly or technically difficult than the benefit. That is, the level of impact of a change of one node to another node may be used as a parameter in updating an affected node.

As described herein, aspects of the present disclosure may generate different visual representations of nodes of different types and at multiple levels of granularity, which improves the use of display screen area and provides a more human-understandable representation of the elements represented by the nodes. For example, one visual representation may be generated for one type of node (e.g., nodes representing a particular type of application), whereas a different visual representation may be generated for a different type of node (e.g., nodes represent organizations in an enterprise). In some embodiments, the nodes may be presented in the form of a network map in which a node may be selected to view additional information about the selected node. Additionally, or alternatively, a selection of a node may provide links to additional information, a document repository associated with the node, etc. Also, aspects of the present disclosure may display any number of levels, tiers, or "hops" between node connections (e.g., display only direct connections, display up to three levels or tiers of connections, etc.) and the number may be user-selectable. As further described herein, aspects of the present disclosure may implement a search function to identify or filter for nodes meeting selected criteria, and may identify connections to those nodes.

In some embodiments, aspects of the present disclosure may access different types of data records from varying types of source databases, which may be distributed and/or disparate. As described herein, the data records may include information regarding elements or components of a system. Examples of the data records may include a dependency matrix, a system level block diagram, a system architecture diagram, an organizational chart, a network diagram, network topology information, a data structure, document configuration management data, hardware or software transition plans, policy documents, compliance documents, or the like. The systems and/or methods, described herein, may standardize the data records from these databases, and identify nodes associated with each data record. Further, based on the information stored in the various databases, aspects of the present disclosure may identify attributes of each node (e.g., type of node, owner/manager of the node, metadata associated with the node, etc.), and connections between the nodes. Additionally, or alternatively, aspects of the present disclosure may interpolate or decipher connections between nodes based on a relationship analysis. Additionally, or alternatively, aspects of the present disclosure may decipher connections between nodes based on determining that certain types of nodes communicate with each other based on the function and/or common attributes of the nodes. In this way, information regarding nodes and their connections may be consolidated from multiple data sources, and the consolidated information may be presented in a cohesive and simple interface.

In some embodiments, the techniques described herein may be used to improve the visibility of organizational data and the visibility of how data flows within the organization's system(s). In this way, strategic and operational opportunities for data development and system improvement may be recognized. Additionally, or alternatively, the impact to one node in a system may be determined based on changes to another node in the system. In this way, updates and modifications may be made, (e.g., to the real-life systems, data, documents, etc. represented by each affected node) such that all nodes are in sync. Aspects of the present disclosure may provide easily understandable visual representations of nodes and node connections, with the option to select a node for additional detailed information regarding the node. The techniques described herein further provide insight into disaster recovery dependencies, provide a single location for referencing information from multiple data sources, and provide enterprise-level visibility for dataflows.

Aspects of the present disclosure provide a particular manner of summarizing and presenting information in electronic devices (e.g., computer workstations, tablets, laptops, etc.). More specifically, aspects of the present disclosure display a limited set of information to the user as compared to conventional user interfaces, thus resulting in an improved user interface for electronic devices and improving the functioning of the computer itself through the improved user interface. As described herein, aspects of the present disclosure may access tens of thousands or potentially millions of data records from various and/or disparate sources, organize the records, consolidate the records, and present data relating to the records to the user in a cohesive, coherent, and usable manner that identifies how changes in one node affect the operation etc. of other nodes. Further, aspects of the present disclosure may allow system administrators to synchronize changes within a complex system after examining a user interface that shows what system elements (e.g., nodes) are affected based on a change to one node. Additionally, or alternatively, aspects of the present disclosure may identify nodes that are affected by a policy change in order to ensure that all nodes are updated to comply with or reflect the policy change. Accordingly, aspects of the present disclosure prevent the situation in which certain nodes operate or are configured with outdated policies, procedures, software, hardware, and/or information, which can negatively affect the systems technical performance. Additionally, or alternatively, aspects of the present disclosure may be used to identify and eliminate data flow redundancies, thereby reducing the consumption of network and computer processing resources, among other things.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1A illustrates a display or GUI showing an overview of an example implementation in accordance with aspects of the present disclosure. As shown in FIG. 1A, an interface 100 may present nodes (shown as circles with labels under them) and connections (a.k.a. edges; shown as lines or arrows that connect the circles) associated with each node. In the example shown, each node may represent an application of a system. However, in other implementations, each node may represent a document in a library of documents, an organization in an enterprise, a server, one or more virtual machines, a database, a sub-system (e.g., a sub-system for tracking package locations, a pricing system, etc.), or the like or any combination of the foregoing. The nodes and their connections may be determined based on an analysis of data records from multiple different data sources (e.g., as described herein below), and the interface 100 may present these nodes and connections (e.g., in the form of a network map, a force directed graph, or the like).

In some embodiments, as shown in FIG. 1A, the interface 100 may include a "highlight applications" area 102 for highlighting and searching for particular application nodes. A map area 104 may present the highlighted nodes (e.g., entered by a user in highlight applications area 102). In the example shown, the nodes Product Tracking and Reporting (PTR) and Global Business System (GBS) applications are highlighted, e.g., as indicated by the black ring around each of them. As further shown, the selection of a node in the map area 104 may highlight the inbound and/or outbound edges, which may represent dataflows or connections, to/from that node in the map area 104. For example, selection of the PTR node causes the interface 100 to display the edges (e.g., representing dataflows, connections, or the like) to/from the PTR node. Additionally, or alternatively, selection of a node presents information about the node (e.g., in a node details section 106), and may also include links to additional information regarding the node, as well as a document repository associated with the node. Examples of details shown in the node details section 106 may include node attributes, such as application type, department name, program name, manager information, administrator information, client information, web hosting information, narrative description, policy information, hardware/software/document version information, manufacture information, and/or any other variety of information related to the node. In some embodiments, inbound, outbound, or both inbound and outbound edges to and from the nodes may be shown in the interface 100. In some embodiments, the number of applications and/or data fields, associated with the selected node, may be presented in a data details section 105. By presenting the nodes in the form of a network map and/or force directed graph, users may search or filter to find nodes of interest based on criteria, and select specific nodes to drill down to more detailed information.

Figure 1B:
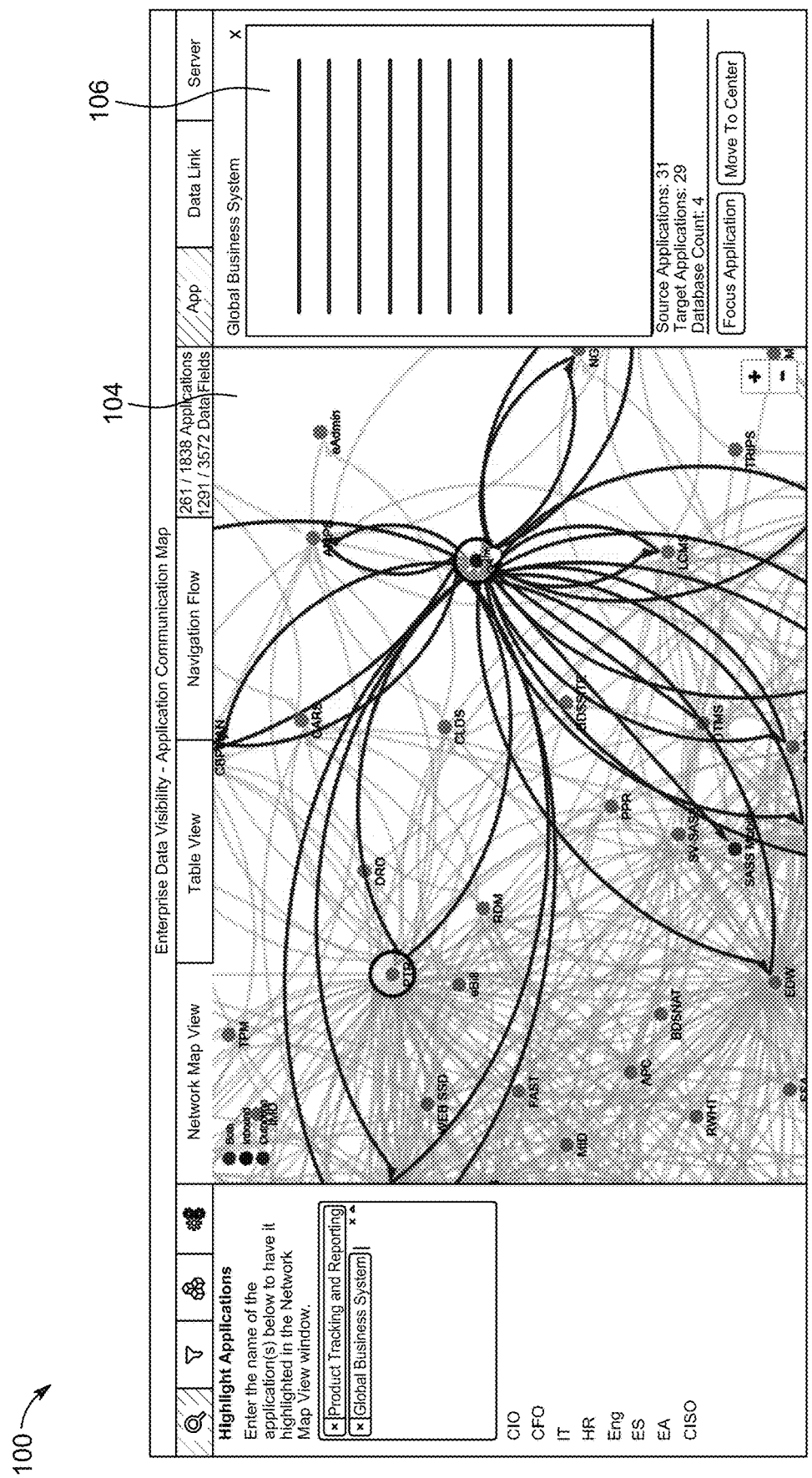
FIG. 1B illustrates a GUI showing an example of connections associated with a selected node.

FIG. 1B illustrates a display or GUI showing an example of connections associated with a selected node. As shown in FIG. 1B, a different node (than the PTR node from FIG. 1A)

may be selected to highlight edges (e.g., representing connections and dataflows) to/from the selected node. In the example shown, the GBS node is selected, as indicated by the "pointing hand" cursor that a user has positioned over the GBS node in the map area 104. To illustrate the change to the interface 100 caused by selecting a particular node, contrast the edges that are emphasized with thicker, darker lines in the map area 104 of FIG. 1A, (which has the PTR node is selected), to the edges that are emphasized with thicker, darker lines in the map area 104 of FIG. 1B. (which has the GBS node selected), and note that all the edges which begin and/or end at the PTR node are emphasized in FIG. 1B and de-emphasized in FIG. 1A. Also, additional details regarding the GBS node may be presented in the node details section 106 based on the selection of the GBS node in FIG. 1B.

Figure 1C:
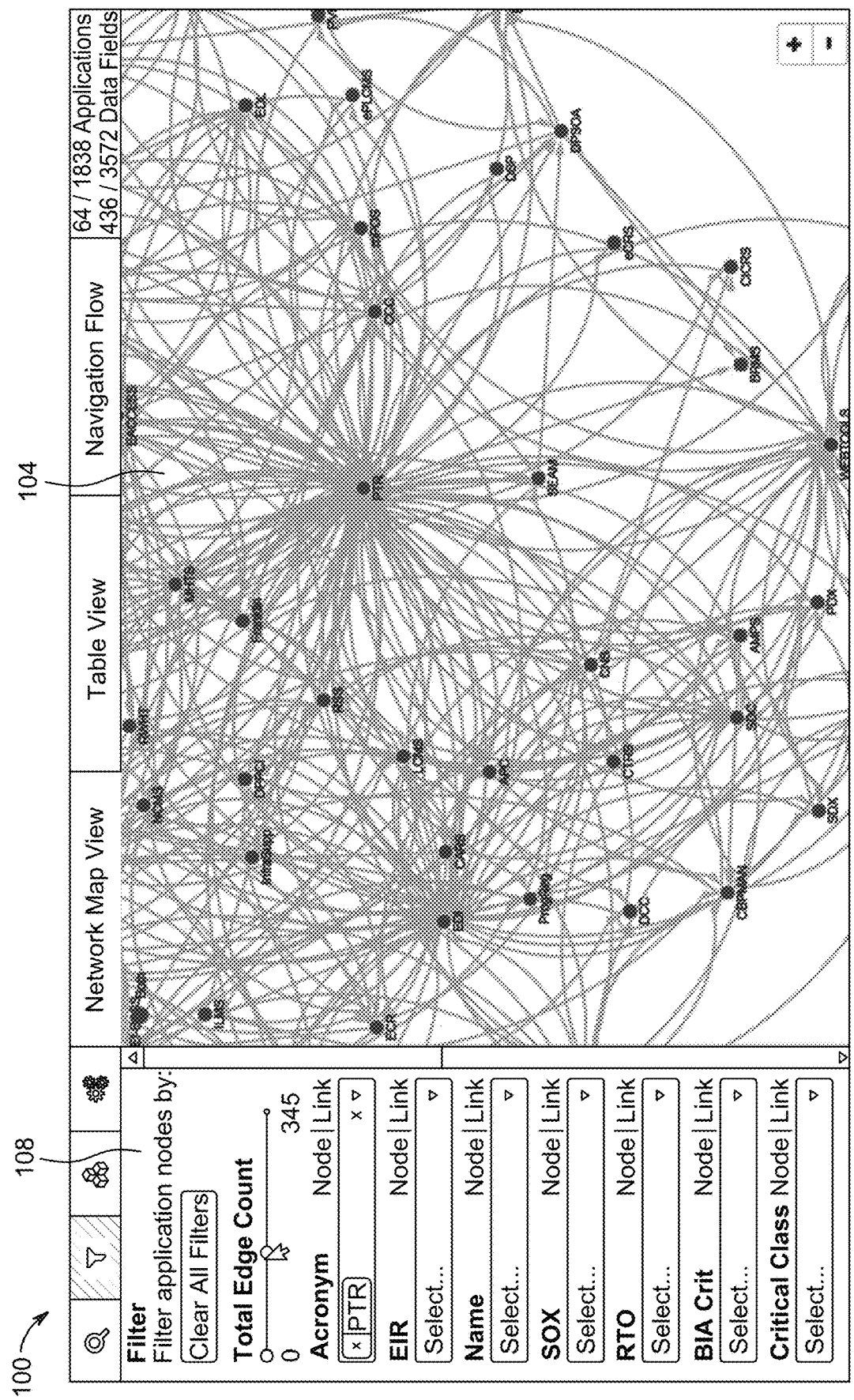
FIG. 1C illustrates a GUI showing an example of filtering nodes based on a set of criteria.

FIG. 1C illustrates a display or GUI showing an example of filtering nodes based on a set of criteria. As shown in FIG. 1C, the interface 100 may include a filtering section 108 in which criteria may be entered that cause the map area 104 to display nodes and/or edges satisfying the criteria. Any contemplated variety of criteria may be presented in the filtering section 108 such that nodes and/or edges of interest that meet the criteria are displayed. Example criteria may include total edge count (e.g., the number of links between applications), node name, acronym, business unit, department, class, etc.

Figure 1D:
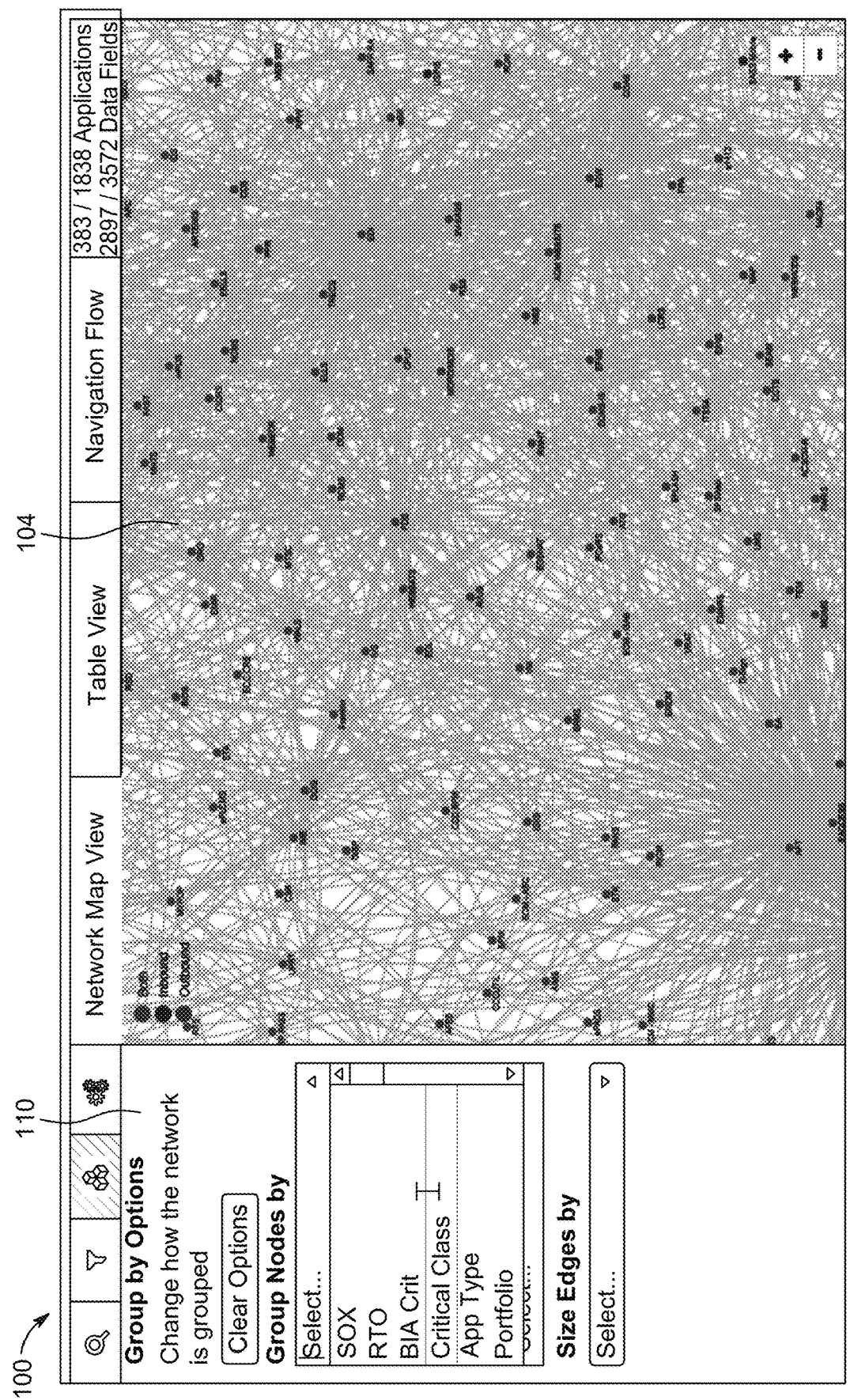
FIG. 1D illustrates a GUI showing an example of grouping nodes based on options and/or criteria.

FIG. 1D illustrates a display or GUI showing an example of grouping nodes based on options. As shown in FIG. 1D, the interface 100 may include a group by options section 110 whereby certain options may be selected or specified by a user in order to group nodes and display the group(s) by selected option. That is, all nodes shown in the interface 100 may represent a selected type of group. In some embodiments, a drop-down menu of the criteria may be presented. In the example shown in FIG. 1D, the "Critical Class" option may be selected such that the nodes are grouped by critical class. Other options may be selected for grouping, such as based on app type, portfolio, or system specific options that may be configurable or specific to a particular system or organization (e.g., "SOX," "RTO," "BIA Crit"). In this way, connections between a particular type of node may be presented. Also, the type of connection between each node (e.g., inbound connection, outbound connection, or both inbound and outbound connection) associated with each node may be presented and indicated based on color, shading, icon, pattern, etc.

Figure 1E:
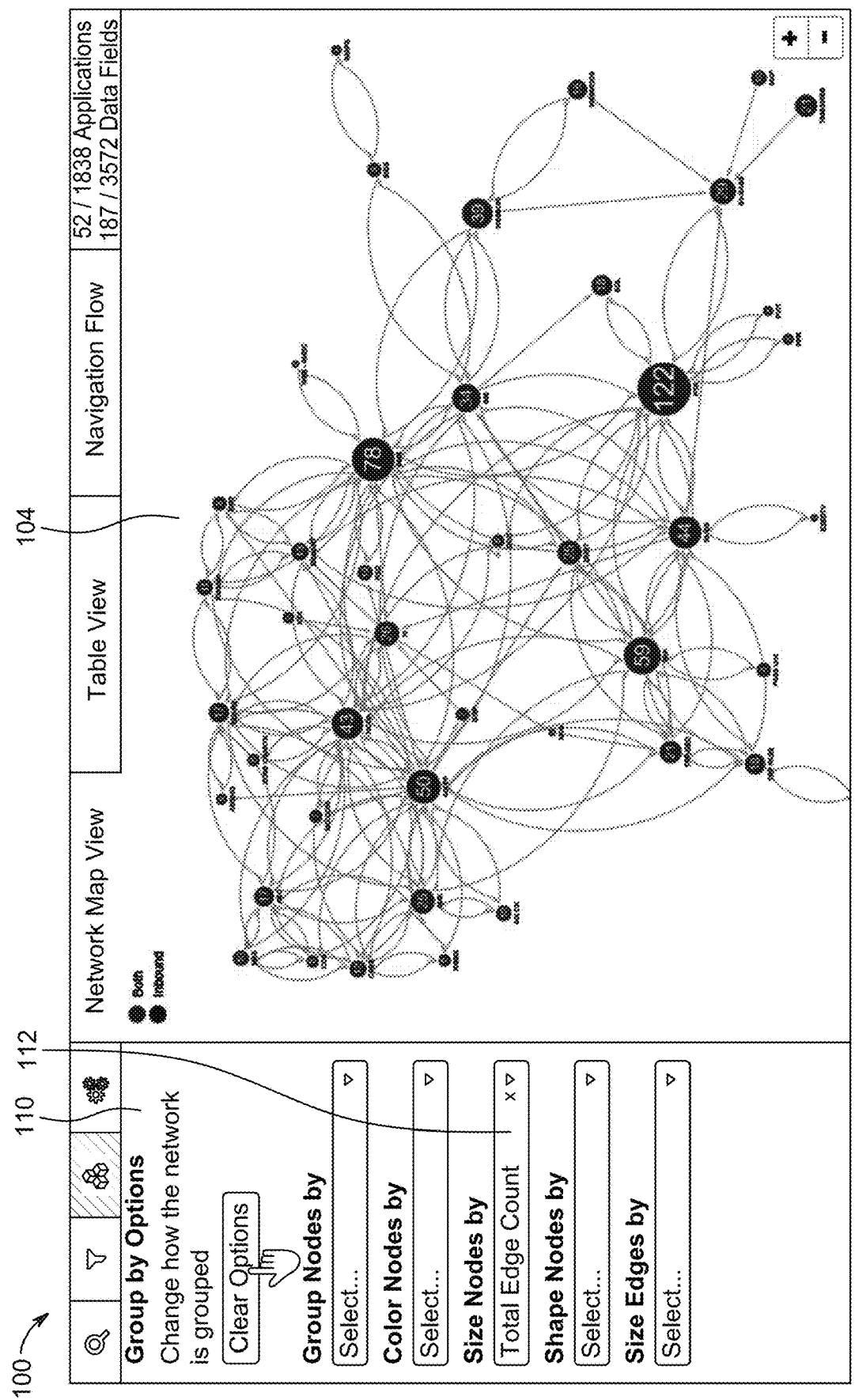
FIG. 1E illustrates a GUI showing an example of displaying the number of edges within each node.

FIG. 1E illustrates a display or GUI showing an example of displaying the number of edges for each node, according to a selected "group by options" criteria. As shown in FIG. 1E, the interface 100 (e.g., within the group by options section 110) may include a drop-down menu 112 for the user to select size nodes by total edge count. In response to this selection, the interface 100 (e.g., within the map area 104) may present the nodes and their edge counts. Further, the size of the circles depicting the nodes may be based on the edge counts in which higher edge counts correspond to larger circles depicting the nodes. In some embodiments, the system may calculate and display the size of a circle depicting a node by making the area of the circle proportional to the number of edges that the node has. For example, a node having two edges may be represented by a circle having an area of two units (e.g., two square millimeters), while a node having fifty edges may be represented by a circle having an area of fifty units (e.g., fifty square mm). Other methods of calculating the circle/node size based on the edge count are also possible. In this way, the user may quickly identify nodes with higher edge counts according to their size in the map area 104, which identification may be used to prioritize those nodes as part of a planning and/or remediation process.

Figure 1F:
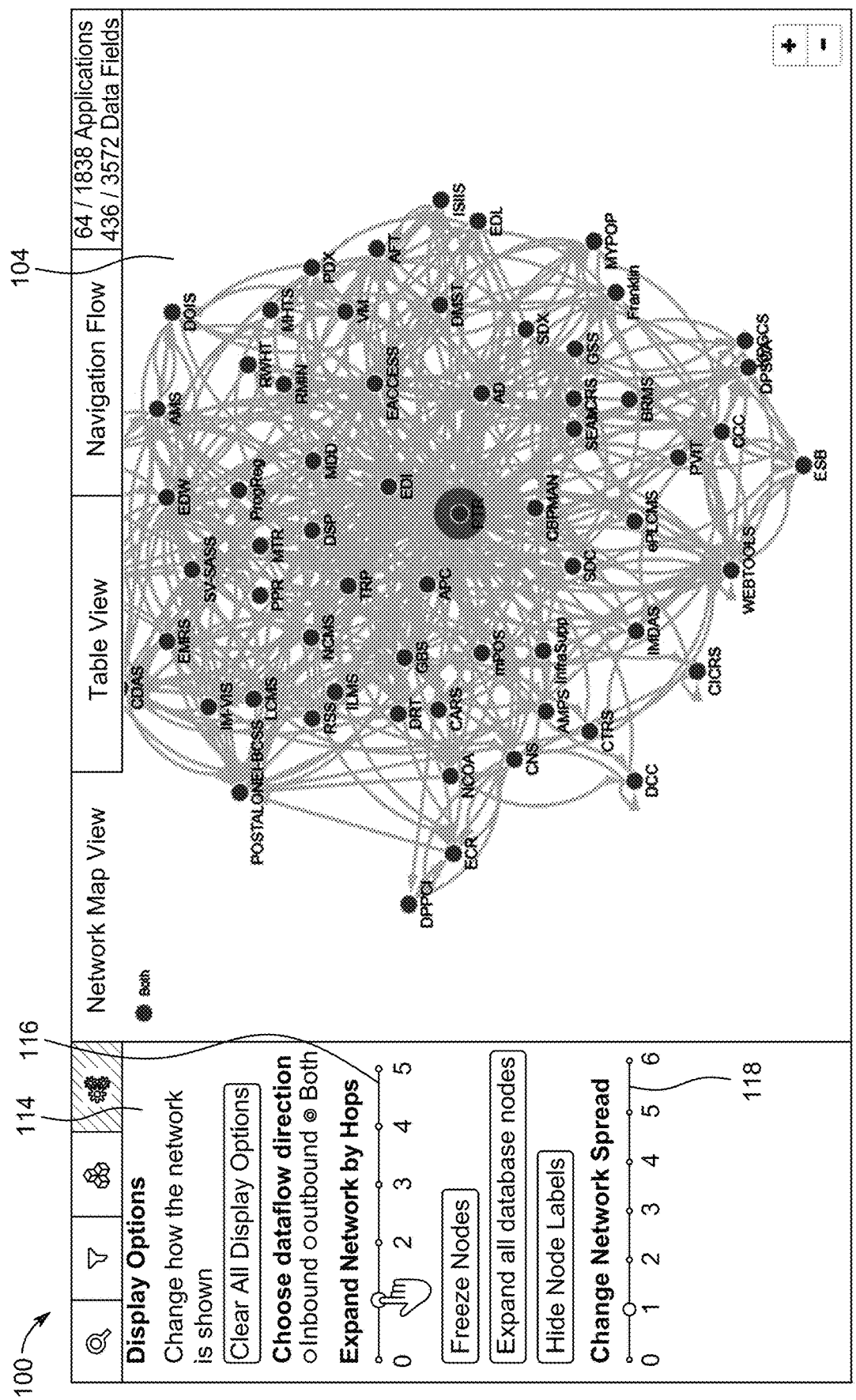
FIG. 1F illustrates a GUI showing an example of expanding the map view of nodes based on a number of hops associated with a selected node.

FIG. 1F illustrates a display or GUI showing an example of expanding the map view of nodes based on a number of hops associated with a selected node. As shown in FIG. 1F, the interface 100 may include a display options section 114 in which the number of hops shown can be adjusted by a slider 116 (e.g., the hops shown for the selected PTR node). As described herein, a "hop" may include an edge, level, or tier associated with the selected node. Thus, when one hop is selected, the interface 100 may present only the nodes in direct connection with the selected PTR node (e.g., nodes having an edge that connects directly to the PTR node, which may be known as hop 1 nodes). When two hops are selected, the interface 100 may change to show an expanded network that includes the hop 1 nodes, and the nodes in direct connection with the hop 1 nodes (e.g., nodes having an edge that connects directly to a hop 1 node, which may be known as hop 2 nodes). In this way, the number of nodes shown may be condensed for cleaner view when visualization of only directly connected nodes is needed, and the number of nodes shown can be expanded for a more complete view of parts of the overall network that can be reached via additional hops from a selected node—i.e., from the selected PTR node in this example.

As further shown in FIG. 1F, the display options section 114 may also include a slider 118 to adjust the spread of the nodes. The spread may be the visual representation of the distance between the nodes in the map area 104. Thus, a smaller spread may be selected to show more nodes in the map area 104, which may cause the edges to overlap and become difficult to trace or distinguish, as shown in the example of FIG. 1E, whereas a larger spread may be selected to show fewer nodes that are farther away from each other in the map area 104 for easier viewing of the edges or connections between nodes. In embodiments, the interface 100 may include a selection to freeze nodes, that is, retain the nodes and connections in place or at their current zoom level. Additionally, or alternatively, the interface 100 may include a selection to expand all nodes, and/or hide the labels associated with the nodes.

Figure 1G:
FIG. 1G illustrates a GUI showing an example of data links section.

FIG. 1G illustrates a display or GUI showing an example of a data links section. The data links section 120 may display information identifying data source connections associated with a selected node (e.g., databases or other data resources that are connected to or communicates with the selected node). For example, as shown in FIG. 1G, the PTR node (as shown selected in FIG. 1F) has 1542 connections (e.g., data items with which it communicates) with the "AT4G Data Pricing Data" data source, 1508 connections with the "Interface with DOISWeb" data source, etc. In some embodiments, the data links may be searched and/or filtered by keywords, column name, business name, and/or other parameter. Example search terms and keywords may include systems names, database names/types, functions, application types, data element types, dataflow direction, last login time, etc.

FIG. 1H illustrates a display or GUI showing an example of table view representing nodes and edges in a system. In general, the table view 122 may present node connection and/or node dependency information in a table format. As shown in FIG. 1H, the table view 122 may identify a source node and a target node. A source node may be a node from which data originates or is transmitted, and the target node may be a node at which the data is received. The table view may also include an identifier of the source and target nodes, and a description of the edge, dataflow, or connection between the source and target nodes. In some embodiments, the table view 122 may include additional information regarding the source and target nodes, such as keywords, sending data name, interface type, communications frequency, connection policies, or the like.

Figure 1I:
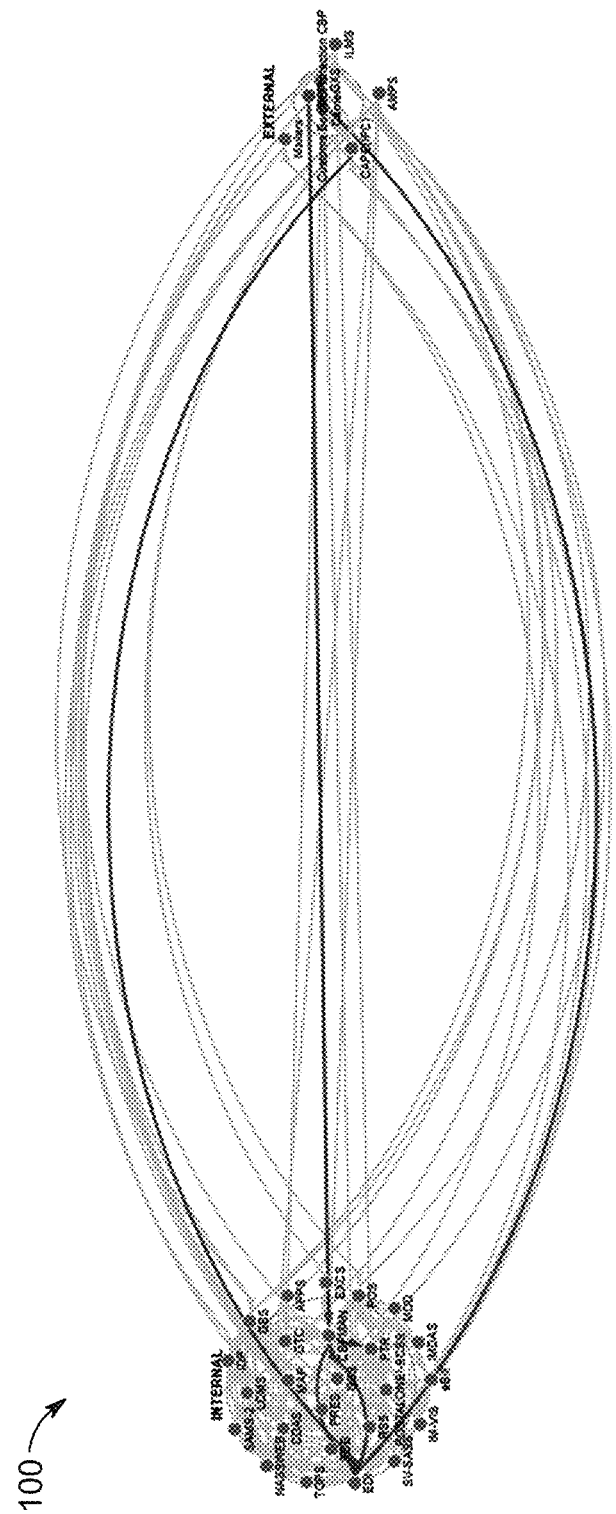
FIG. 1I illustrates a GUI showing an example of a view in which nodes are grouped by internal and external entities.

FIG. 1I illustrates a display or GUI showing an example of a view in which nodes are grouped by internal and external entities. As shown in FIG. 1I, the interface 100 may present nodes such that internal nodes are presented on one side, and external nodes are presented on an opposite side. In some embodiments, internal nodes may be nodes that are internal to a particular organization, department, enterprise, group, geographic location, etc.

Figure 2:
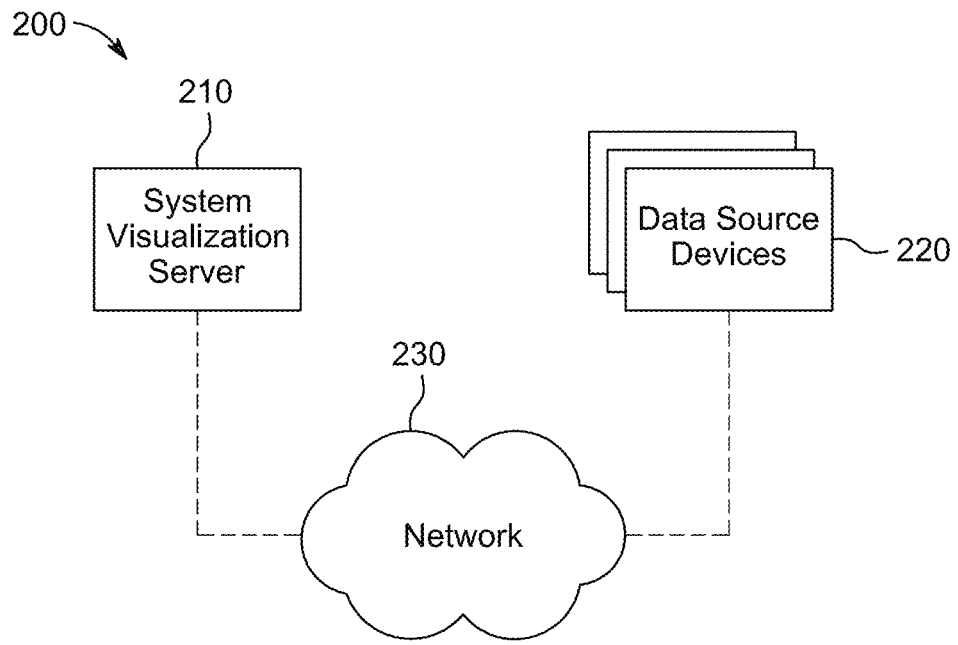
FIG. 2 shows an example environment as described herein.

FIG. 2 shows an example environment in accordance with aspects of the present disclosure. As shown in FIG. 2, environment 200 includes a system visualization server 210, one or more data source devices 220, and a network 230.

The system visualization server 210 may include one or more computing devices that accesses and consolidates data records from multiple data sources, databases, etc., from the data source devices 220. In some embodiments, the system visualization server 210 may standardize the data records, and identify nodes associated with each data record. Further, based on the information stored in the various data records, the system visualization server 210 may identify attributes of each node, and connections between the nodes. For example, the data records may be included in a data structure and may be structured in such a way that identifies node attributes and their connections. Additionally, or alternatively, the system visualization server 210 may interpolate or decipher connections between nodes using a relationship analysis. Additionally, or alternatively, the system visualization server 210 may decipher connections between nodes by determining that certain types of nodes communicate with each other based on the function and/or common attributes of the nodes.

In some embodiments, the system visualization server 210 may implement an application (e.g., execute instructions) for presenting the nodes and edges or connections in an interface (e.g., in the example interface 100 of in FIGS. 1A-1I). The system visualization server 210 may be an application server that presents the interface 100 to a user via a user device (e.g., a desktop computer, a laptop computer, a tablet device, a smartphone, a monitor, etc.). In some embodiments, the system visualization server 210 may receive user inputs via or in conjunction with the interface and respond to the user inputs according. For example, the system visualization server 210 may receive user inputs to alter or adjust the view of the nodes, filter out certain nodes based on a set of criteria, search for nodes based on a set of criteria, present the nodes in the form of a table, apply a force to a node to see the impact on other connected nodes (e.g., when the nodes are presented as force directed graph), export a view of the node, export information about the node, etc. Additionally, or alternatively, the system visualization server 210 may receive user input to modify data associated with the node (e.g., via a change request form). Based on receiving the user input to modify the data, the system visualization server 210 may send a change request to an owner of the node to verify that the requested change is valid.

The data source devices 220 may include one or more computing devices that store data records that may identify nodes, their connections, and other attributes regarding each node. For example, the data records may include a dependency matrix, a system level block diagram, a system architecture diagram, an organizational chart, a network diagram, a data structure, document configuration management data, hardware or software transition plans, policy documents, compliance documents (e.g., GDPR policy documents), or the like. As described above, the system visualization server 210 may access and consolidate these data records, standardize the records, and present them in a user interface (e.g., in the form of a network map, force direction graph, table, etc.).

The network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 230 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
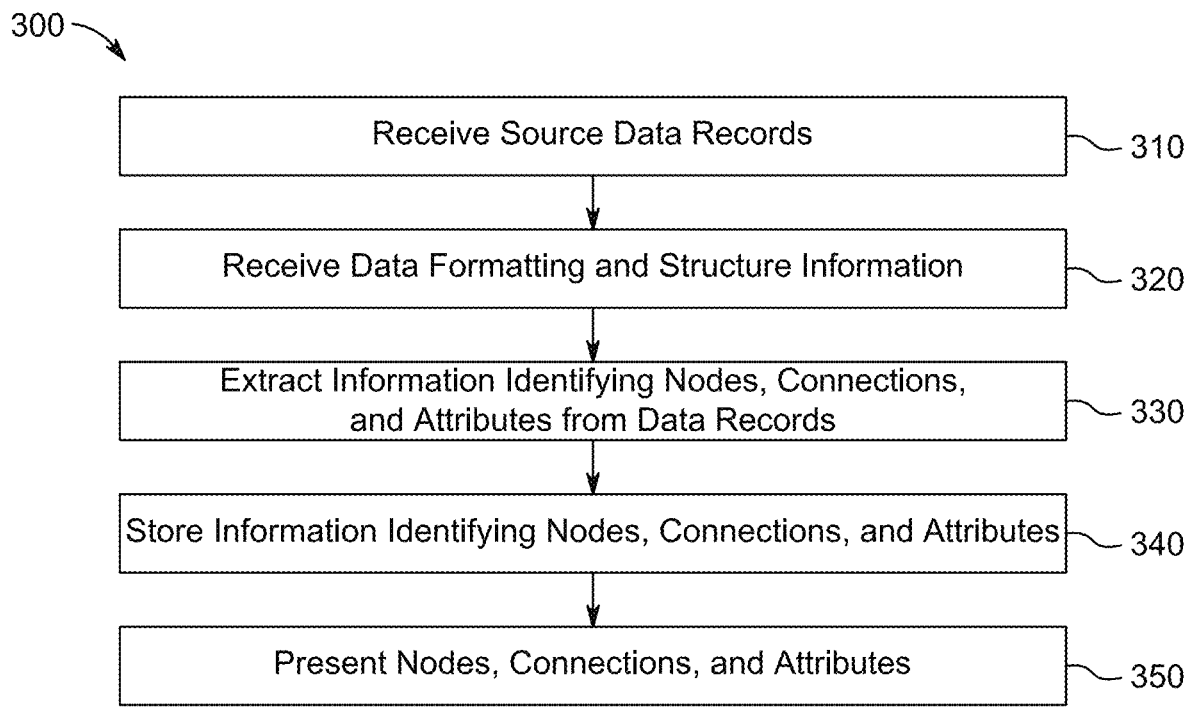
FIG. 3 illustrates an example flowchart of a process for analyzing data records to identify nodes, and presenting the nodes and connections.

FIG. 3 illustrates an example flowchart of a process for analyzing data records to identify nodes, and presenting the nodes and connections. The steps of FIG. 3 may be implemented in the environment of FIG. 2, for example, and are described using reference numbers of elements depicted in FIG. 2. The flowchart illustrates the architecture, functionality, and operation of possible implementations of systems, methods, and computer program products according to various embodiments of the present disclosure.

As shown in FIG. 3, process 300 includes receiving source data records (block 310). In various implementations, a source data record may include a dependency matrix, a system level block diagram, a system architecture diagram, an organizational chart, a network diagram, a data structure, document configuration management data, hardware or software transition plans, policy documents, compliance documents (e.g., GDPR policy documents), or the like. In some embodiments, the system visualization server 210 may receive source data records from one or more data source devices 220. In some embodiments, the system visualization server 210 may access the data source devices 220 as part of an initial set up for gathering and consolidating the data records stored across multiple sources. Also, the system visualization server 210 may access the data source devices 220 to obtain updated records to update nodes and connections.

Process 300 also includes receiving data formatting and structure information (block 320). For example, since different nodes may represent different types of elements, different data records from different systems and databases may be formatted and/or structured differently in different schemas. Accordingly, the system visualization server 210 may receive information that defines how different data records are formatted and structured. More specifically, the formatting and structuring information may define locations in a data record or data source that correspond to a node name, or node type, and the locations in the data record or data source that correspond to connections and other attributes (e.g., description of the node, alternate node identifiers, responsible departments that maintain the node, etc.). As an example, if a data source represents a sub-system, the data formatting and structuring information may identify where in the data source, or in the source data record, the information regarding the sub-system, its attributes, and connections are stored. In some embodiments, the system visualization server 210 may receive the data formatting and structure information from the respective data source devices 220 from which the data records originated.

Process 300 further includes extracting information identifying nodes, connections and attributes from the source data records (block 330). For example, the system visualization server 210 may analyze the source data records and apply the formatting and structure information to those data records to extract specific information and attributes from the data records, such as information regarding connections to other devices, documents, etc. Also, the system visualization server 210 may combine information from multiple different data sources to identify nodes, connections, attributes, and the like. Additionally, or alternatively, the system visualization server 210 may extract information from the data records and/or data sources using other techniques. For example, in a scenario in which a data record is a document, the system visualization server 210 may extract information using text parsing, natural language processing, and/or other text analysis techniques to identify node names, attributes, and connections.

Process 300 also includes storing information identifying nodes, connections, and attributes (block 340). For example, the system visualization server 210 may store the extracted information identifying the nodes, connections, and attributes. In some embodiments, the system visualization server 210 may store the extracted information identifying the nodes, connections, and attributes in one or more local and/or remote databases.

Process 300 further includes presenting the nodes, connections, and attributes (block 350). For example, the system visualization server 210 may present the nodes, connections, and/or attributes in an interface, such as the interface 100 as shown in FIGS. 1A-1I. In some embodiments, the system visualization server 210 may present the interface 100 to a user via a user device (e.g., a desktop computer, a laptop computer, a tablet device, a smartphone, etc.). In some embodiments, the system visualization server 210 may present the interface 100 with the nodes, connections, and/or attributes in the form of a force directed graph, a table, a network map, or the like. Further, in various implementations, a user may interact with the interface 100 to modify and adjust the presentation of nodes based on filtering and/or search criteria, viewing options, etc. In this way, information regarding nodes and their connections and attributes may be consolidated from multiple data sources, and presented in a cohesive and simple interface to make more efficient use of display screen space, clearly represent connections and data-sharing relationships, facilitate and improve system analysis, planning, system efficiency, hardware/software transitioning, outage responses, etc.

For example, as described above, when one node is affected by an outage (e.g., a hardware failure or maintenance), or an update (e.g., hardware update, software update, policy update, data update (e.g., pricing data change), etc.), the level of impact of other nodes may be determined (e.g., based on the number of hops between connected nodes and affected node, a measure of similarity between the connected nodes and the affected node, etc.). The level of impact may be used when planning and mitigating node outages and changes. For example, based on the level of impact, a planning system (e.g., implemented by the system visualization server 210 and/or an external system) may adjust a plan (e.g., an outage mitigation plan, a hardware/software updating plan, a document change plan, etc.). Additionally, or alternatively, the planning system may adjust a plan to synchronize changes across nodes that share common attributes, or have a threshold level of commonality. In some embodiments, a level of commonality between two nodes may be based on the number and types of attributes that the nodes have in common, and/or the degree to which two nodes are similar. The level of commonality may be represented as a number, and the planning system may adjust a plan to synchronize changes across nodes having a threshold level of commonality between them, Further, the presentation of the nodes in interface 100 may allow easy and efficient identification of nodes affected by a system update such that changes may be synchronized across affected nodes.

Figure 4:
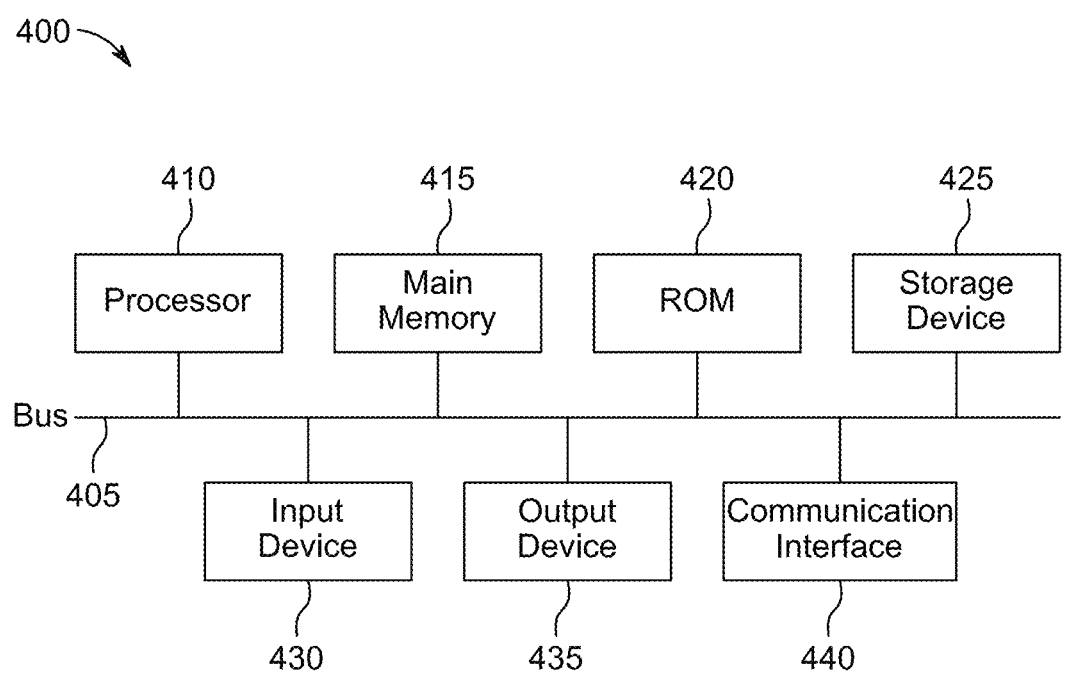
FIG. 4 illustrates example components of a device that may be used within the environment of FIG. 2.

FIG. 4 illustrates example components of a device 400 that may be used within environment 200 of FIG. 2. Device 400 may correspond to the system visualization server 210 and/or the data source devices 220. Each of the system visualization server 210 and/or the data source devices 220 may include one or more devices 400 and/or one or more components of device 400.

As shown in FIG. 4, device 400 may include a bus 405, a processor 410, a main memory 415, a read only memory (ROM) 420, a storage device 425, an input device 440, an output device 445, and a communication interface 440.

Bus 405 may include a path that permits communication among the components of device 400. Processor 410 may be or include a processor, a microprocessor, an application specific integrated circuit (ASIC), a field programmable gate array (FPGA), or another type of processor that interprets and executes instructions. Main memory 415 may be or include a random access memory (RAM) or another type of dynamic storage device that stores information or instructions for execution by processor 410. ROM 420 may be or include a ROM device or another type of static storage device that stores static information or instructions for use by processor 410. Storage device 425 may be or include a magnetic storage medium, such as a hard disk drive, or a removable memory, such as a flash memory.

Input device 440 may be or include a component that permits an operator to input information to device 400, such as a control button, a keyboard, a keypad, or another type of input device. Output device 445 may be or include a component that visually presents or otherwise outputs information to the operator, such as a light emitting diode (LED), a display, a monitor, or another type of output device. Communication interface 440 may be or include any transceiver-like component that enables device 400 to communicate with other devices or networks. In some implementations, communication interface 440 may include a wireless interface, a wired interface, or a combination of a wireless interface and a wired interface. In embodiments, communication interface 440 may receiver computer readable program instructions from a network and may forward the computer readable program instructions for storage in a computer readable storage medium (e.g., storage device 425).

Device 400 may perform certain operations, functions, steps, or processes, as described in detail below. Device 400 may perform these operations in response to processor 410 executing software instructions contained in a computer-readable medium, such as main memory 415. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 415 from another computer-readable medium, such as storage device 425, or from another device via communication interface 440. The software instructions contained in main memory 415 may direct processor 410 to perform processes, functions, steps, and/or operations that will be described in greater detail herein. Alternatively, hardwired circuitry may be used in place of or in combination with software instructions to implement the processes, operations, etc. described herein. Thus, implementations described herein are not limited to any specific combination of hardware circuitry and software.

In some implementations, device 400 may include additional components, fewer components, different components, or differently arranged components than are shown in FIG. 4.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions in certain embodiments.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act/operation specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s) or operation(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/ or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code-it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method for implementing a user interface on electronic devices that visually maps nodes and connections between the nodes in a graphical user interface, the nodes and the connections determined based on an analysis of data records from multiple data sources, the method executing instructions to perform operations comprising:
receiving data records from one or more data sources;
presenting and highlighting, in a map area of a display associated with the user interface, nodes and connections associated with the one or more data sources;
receiving, in a filtering section of the display, criteria for filtering the nodes, the connections, or both the nodes and the connections;
displaying, in the map area, the nodes and the connections satisfying the criteria;
receiving, in a group by options section of the display, options that specify criteria to group the nodes;
displaying the nodes grouped by the criteria specified in the options;
receiving a selection of a node from the nodes that are displayed in the map area;
displaying, in a data links section, information identifying data source connections associated with the selected node;
presenting information about the selected node, including any one of links to the information about the selected node, a document repository associated with the selected node, or a number of applications or data fields associated with the selected node;
displaying and emphasizing inbound edges or outbound edges of the connections to and from the selected node, the inbound edges and the outbound edges representing dataflows;
de-emphasizing inbound edges and outbound edges of the nodes that are not the selected node;
adjusting, in a display options section, a number of hops associated with the selected node, and specifying a spread between nodes, wherein the spread represents a visual distance between nodes;
displaying, in the map area, nodes and connections that are within the number of hops from the selected node according to the specified spread;
determining a level of impact of a proposed change to the selected node to connected nodes based on the number of hops from the selected node to each of the connected nodes; and
declining to synchronize the proposed change to the selected node based at least on the level of impact.

2. The method of claim 1, the operations further comprising:
identifying the connections based on relationships or dataflows between the nodes.

3. The method of claim 1, wherein each of the nodes represents at least one of:
a document;
an organization;
an application;
a server;
a virtual machine;
a database; or
a sub-system.

4. The method of claim 1, the operations further comprising: receiving data formatting or data structuring information, and extracting information from the data records based on the data formatting or the data structuring information.

5. The method of claim 1, wherein the data records include at least one of:
a dependency matrix;
a system level block diagram;
a system architecture diagram;
an organizational chart;
a network diagram;
network topology information;
a data structure, document configuration management data;
hardware or software transition plans;
policy documents; or
compliance documents.

6. The method of claim 1, the operations further comprising: adjusting a plan that affects the nodes based on the level of impact.

7. The method of claim 1, the operations further comprising: grouping the nodes based on common attributes.

8. The method of claim 1, the operations further comprising: visually presenting the nodes and the connections in a form of at least one of:
a force directed graph, a network map, or a table.

9. The method of claim 1 wherein the operations further comprise:
   receiving, in the group by options section, a selection of sizing nodes by total edge count; and
   presenting each of the nodes with a corresponding count of the connections associated with the node, wherein the size of a graphic representing the node is based on the count.

10. A computer program product for implementing a user interface on electronic devices that visually maps nodes and connections between the nodes in a graphical user interface, the nodes and the connections determined based on an analysis of data records from multiple data sources, the computer program product comprising a non-transitory computer readable storage medium having program instructions embodied therewith, the program instructions executable by a computing device to cause the computing device to perform operations comprising:
   receiving data records from one or more data sources;
   presenting and highlighting, in a map area of a display associated with the user interface, nodes and connections associated with the one or more data sources;
   receiving, in a filtering section of the display, criteria for filtering the nodes, the connections, or both the nodes and the connections;
   displaying, in the map area, the nodes and the connections satisfying the criteria;
   receiving, in a group by options section of the display, options that specify criteria to group the nodes;
   displaying the nodes grouped by the criteria specified in the options;
   receiving a selection of a node from the nodes that are displayed in the map area;
   displaying, in a data links section, information identifying data source connections associated with the selected node;
   presenting information about the selected node, including any one of links to the information about the selected node, a document repository associated with the selected node, or a number of applications or data fields associated with the selected node;
   displaying and emphasizing inbound edges or outbound edges of the connections to and from the selected node, the inbound edges and the outbound edges representing dataflows;
   de-emphasizing inbound edges and outbound edges of the nodes that are not the selected node;
   adjusting, in a display options section, a number of hops associated with the selected node, and specifying a spread between nodes, wherein the spread represents a visual distance between nodes;
   displaying, in the map area, nodes and connections that are within the number of hops from the selected node according to the specified spread;
   determining a level of impact of a proposed change to the selected node to connected nodes based on the number of hops from the selected node to each of the connected nodes; and
   declining to synchronize the proposed change to the selected node based at least on the level of impact.

11. The computer program product of claim 10, the operations further comprising:
   identifying the connections based on relationships or communication dataflows between the nodes.

12. The computer program product of claim 10, wherein each of the nodes represents at least one of:
   a document;
   an organization;
   an application;
   a server;
   a virtual machine;
   a database; or
   a sub-system.

13. The computer program product of claim 10, the operations further comprising: visually presenting the nodes and the connections in a form of at least one of:
   a force directed graph,
   a network map, or
   a table.

14. A system that implements a user interface on electronic devices that visually maps nodes and connections between the nodes in a graphical user interface, the connections determined based on an analysis of data records from multiple data sources, the system comprising:
   one or more memory devices that stores instructions; and
   one or more processors that are operably connected to the one or more memory devices and that execute the instructions to perform operations comprising:
   receiving data records from one or more data sources;
   presenting and highlighting, in a map area of a display associated with the user interface, nodes and connections associated with the one or more data sources;
   receiving, in a filtering section of the display, criteria for filtering the nodes, the connections, or both the nodes and the connections;
   displaying, in the map area, the nodes and the connections satisfying the criteria;
   receiving, in a group by options section of the display, options that specify criteria to group the nodes;
   displaying the nodes grouped by the criteria specified in the options;
   receiving a selection of a node from the nodes that are displayed in the map area;
   displaying, in a data links section, information identifying data source connections associated with the selected node;
   presenting information about the selected node, including any one of links to the information about the selected node, a document repository associated with the selected node, or a number of applications or data fields associated with the selected node;
   displaying and emphasizing inbound edges or outbound edges of the connections to and from the selected node, the inbound edges and the outbound edges representing dataflows;
   de-emphasizing inbound edges and outbound edges of the nodes that are not the selected node;
   adjusting, in a display options section, a number of hops associated with the selected node, and specifying a spread between nodes, wherein the spread represents a visual distance between nodes;
   displaying, in the map area, nodes and connections that are within the number of hops from the selected node according to the specified spread;
   determining a level of impact of a proposed change to the selected node to connected nodes based on the number of hops from the selected node to each of the connected nodes; and
   declining to synchronize the proposed change to the selected node based at least on the level of impact.

15. The system of claim 14, the operations further comprising: visually presenting the nodes and the connections in a of a force directed graph.

\* \* \* \* \*